United States Patent
Jürs et al.

(10) Patent No.: US 9,125,424 B2
(45) Date of Patent: Sep. 8, 2015

(54) METHOD FOR MAKING A FILLETING CUT FOR FILLETING FISH, DEVICE FOR MAKING THE FILLETING CUT ACCORDING TO THE METHOD, AND CIRCULAR KNIFE PAIR AND CIRCULAR KNIFE SET UP FOR THE METHOD AND THE DEVICE

(75) Inventors: Michael Jürs, Neustadt (DE); Matthias Schroeder, Badendorf (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/394,266

(22) PCT Filed: Apr. 24, 2012

(86) PCT No.: PCT/EP2012/057493
§ 371 (c)(1),
(2), (4) Date: Oct. 13, 2014

(87) PCT Pub. No.: WO2013/159814
PCT Pub. Date: Oct. 31, 2013

(65) Prior Publication Data
US 2015/0087214 A1 Mar. 26, 2015

(51) Int. Cl.
*A22C 25/16* (2006.01)

(52) U.S. Cl.
CPC ....................................... *A22C 25/16* (2013.01)

(58) Field of Classification Search
USPC .................. 452/149–153, 160–162, 165, 170
See application file for complete search history.

(56) References Cited

U.S. PATENT DOCUMENTS 4,112,547 A * 9/1978 Glushkov et al. ............. 452/162
(Continued)

FOREIGN PATENT DOCUMENTS

| DE | 19817840 A1 | 1/1999 |
| DE | 19745891 A1 | 4/1999 |
| WO | 2013159814 A1 | 10/2013 |

OTHER PUBLICATIONS

PCT/EP2012/057493 International Search Report and Written Opinion Date of Mailing: Jan. 30, 2013 Nordischer Maschinenbau Rud. Baader GmbH + Co. KG pp. 12.

*Primary Examiner* — Richard Price, Jr.
(74) *Attorney, Agent, or Firm* — Sunstone IP

(57) ABSTRACT

A method for performing a filleting cut for filleting fish which are conveyed tail-first is carried out along a row of wedge-shaped ray bones projecting away from a main bone stem with a wedge width increasing from ray bone to ray bone by a pair of circular knives having sharp cutting edges. Starting from the tail end, meat of each fish is cut by the circular knife pair having a V-shaped arrangement as a result of the fact that a cutting gap having the smallest cutting edge spacing is set to a basic size which is at least substantially equal to or smaller than a wedge width of the outermost ray bone at the tail end of the conveyed fish. In the fixed position of the V-shaped arrangement, the ray bones are guided through the cutting gap, wherein the circular knife cutting edges, which in their cutting edge region are flexibly deformable out of the associated circular knife surface counter to an elastic restoring force, are displaced counter to the elastic restoring force by the broadening ray bones with increasing widening of the cutting gap. A tailored suitable apparatus comprises a circular knife pair having cutting edges which, in the fixed V-shaped arrangement, are designed such as to be able to be deformed with a degree of deformation defined by the difference between ray bone wedge widths. Circular knives configured for the apparatus may each have a cutting edge region which is deformable in a wave-like manner along the cutting edge as a result of a bending pressure transverse to the circular knife surface.

18 Claims, 5 Drawing Sheets

(56) References Cited

U.S. PATENT DOCUMENTS

Figure 1A:
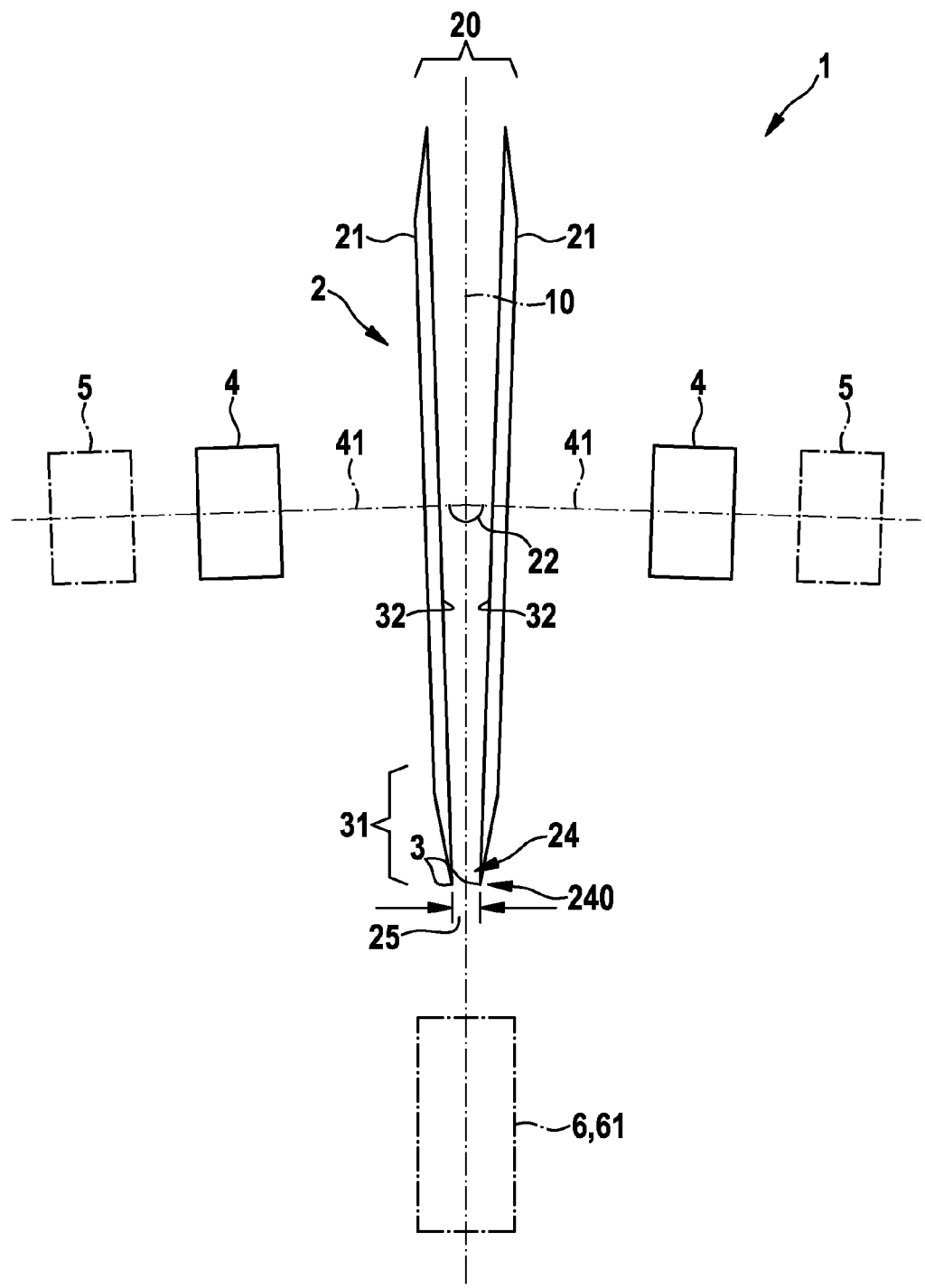

| | | | |
|---|---|---|---|
| 4,336,634 A * | 6/1982 | Braeger | 452/135 |
| 5,871,395 A * | 2/1999 | Grabau et al. | 452/162 |
| 6,280,313 B1 * | 8/2001 | Braeger et al. | 452/161 |
| 6,322,437 B1 | 11/2001 | Grabau et al. | |
| 8,814,637 B2 * | 8/2014 | Jurs et al. | 452/162 |
| 2010/0186760 A1 | 7/2010 | Sieredzinski | |

* cited by examiner

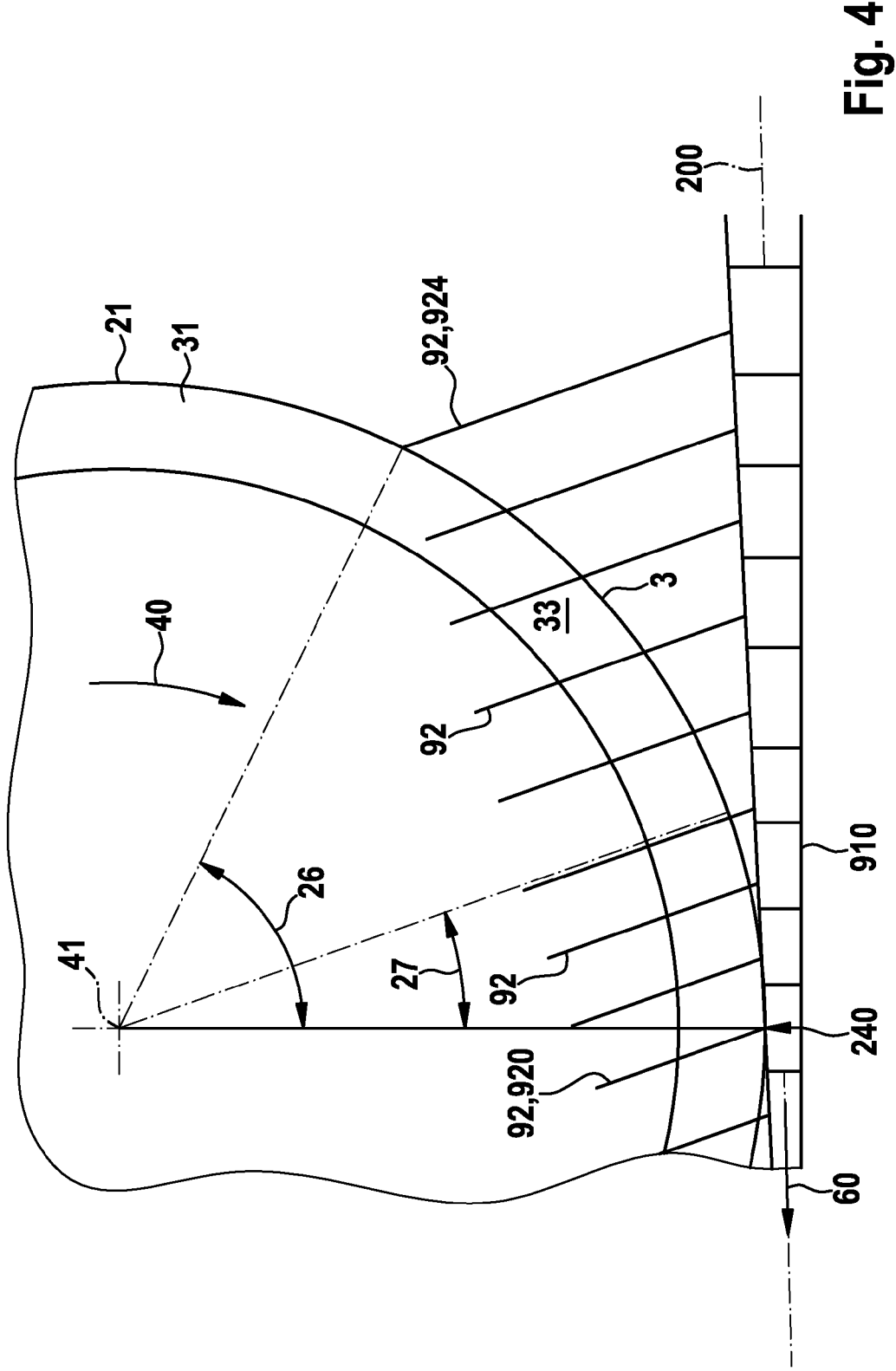

METHOD FOR MAKING A FILLETING CUT FOR FILLETING FISH, DEVICE FOR MAKING THE FILLETING CUT ACCORDING TO THE METHOD, AND CIRCULAR KNIFE PAIR AND CIRCULAR KNIFE SET UP FOR THE METHOD AND THE DEVICE

CROSS-REFERENCE TO RELATED APPLICATIONS

This application is a National Stage Application of PCT/EP2012/057493, filed Apr. 24, 2012, the subject matter of which is incorporated herein by reference in its entirety.

BACKGROUND OF THE INVENTION

The invention relates to a method for performing a filleting cut for filleting fish, wherein the fish are conveyed tail-first in a filleting line and the filleting cut is performed along a row of wedge-shaped ray bones projecting away from a main bone stem with a wedge width increasing from ray bone to ray bone by means of a pair of circular knives which have sharp cutting edges and which cut through meat, said circular knives having drive axes which are oriented at a knife angle relative to one another and define a V-shaped arrangement of the circular knives, wherein the conveyed fish are cut by the filleting cut starting from their tail end. The invention also relates to an apparatus for performing the filleting cut according to said method, comprising a pair of circular knives which have sharp cutting edges and which cut through meat, said circular knives having drive axes which are oriented at a knife angle relative to one another and define a V-shaped arrangement of the circular knives, as well as a conveying device by which the fish are conveyed tail-first in a row and which leaves a free space in which the circular knife pair is arranged for cutting off the meat along a row of ray bones of the fish. Also provided are a circular knife pair and a circular knife configured for said pair for carrying out the method and for use in said apparatus.

Filleting cuts of the kind in question are performed in order to separate muscle meat from ray bones (spoke bones) of fish. The fish to be processed or filleted are fish from which the head has been removed and which have been at least substantially gutted. Usually there is provided on one side an apparatus for cutting the muscle meat away from ventral ray bones and on the other side an apparatus for cutting the muscle meat away from dorsal ray bones. It is important that a meat yield that is as large as possible is achieved by a filleting apparatus. In other words, as little fillet meat as possible should remain on the main bone of the fish. The achievable amount of fillet meat is substantially proportional to the cut surfaces produced. Therefore, filleting knives should be guided along as close as possible to the meat-bearing bones without any bones or fins remaining on the fillet meat. In this regard, special measures are required since the geometry of ray bones which project away from the main bone stem varies over the length of the fish. At the tail end of the fish, the wedge-shaped ray bones are relatively small and thin and to a certain extent also relatively soft, whereas towards the middle of the fish they become broader from ray bone to ray bone in terms of their wedge shape at the base next to the main bone or the main bone stem of the fish.

In order to adapt the filleting cuts to the geometry of the ray bones with regard to the fillet meat yield, according to WO 99/20115 there is provided for performing a back cut a pair of circular knives which are arranged in a V-shaped manner and the cutting gap of which is variable by essentially two measures. On the one hand, it is possible to vary the spacing of their cutting edges from a fish conveying path and also their angular position relative to one another. On the other hand, the circular knives are displaceable counter to spring means. Another known apparatus provides circular knives in a V-shaped arrangement which are displaceable counter to a spring force, wherein the circular knives are arranged in relation to a fish conveying path (filleting line) in such a way that the narrowest position of the cutting gap lies above the lower zenith of the circular knives, or the zenith located closest to the fish, in order to be able to cut off fillet meat in the most optimal manner possible in spatial terms. The known measures require special machine/apparatus elements and units as well as control measures. This is associated with adjustment work and also a maintenance and cleaning effort.

BRIEF SUMMARY OF THE INVENTION

The invention aims significantly to improve the fillet meat yield by relatively simple means, wherein the operation of the apparatus with regard to handling and control is also to be simplified and improved. In particular, the adjustment work and cleaning and maintenance effort is also to be reduced.

The aims according to the invention are achieved in a surprisingly simple manner in conjunction with the steps of the aforementioned method in that the filleting cut is performed with a setting and position of the circular knives such that the circular knives in the V-shaped arrangement have at their zenith points of the cutting edges located closest to the main bone stem a set smallest cutting edge spacing which defines a cutting gap, and in that, starting from the tail end, meat of each fish is cut by means of the circular knife pair such that the cutting gap with the smallest cutting edge spacing is set to a basic size which is at least substantially equal to or smaller than a wedge width of the outermost ray bone at the tail end of the conveyed fish, and in that, in the fixed position of the V-shaped arrangement of the circular knives, the ray bones, the wedge widths of which increase from ray bone to ray bone towards the fish head end, are guided by the fish conveyor through the cutting gap in a manner bearing against the circular knife cutting edges, wherein, starting from the basic size in the fixed V-shaped arrangement, the circular knife cutting edges, which in their cutting edge region are flexibly deformable out of the associated circular knife surface counter to an elastic restoring force, are displaced counter to the elastic restoring force by means of the broadening ray bones with increasing widening of the cutting gap.

Also provided according to the invention is an apparatus for performing a filleting cut by the method according to the invention, comprising a pair of circular knives which have sharp cutting edges and which cut through meat, said circular knives having drive axes which are oriented at a knife angle relative to one another and define a V-shaped arrangement of the circular knives, as well as a conveying device by which the fish are conveyed tail-first in a row and which leaves a free space in which the circular knife pair is arranged for cutting through the meat along a row of ray bones of the fish that project away from a main bone stem, wherein the circular knives in their V-shaped arrangement form at zenith points of the cutting edges located closest to the passing main bone stem a cutting gap which has the smallest cutting edge spacing of the knife pair, the size of which can be configured or set for cutting the conveyed fish, wherein the V-shaped arrangement of the circular knives has a fixed basic position to which there is assigned said smallest cutting edge spacing with a fixed basic size which is at least substantially equal to or smaller than a wedge width of the outermost ray bone at the tail end of the conveyed fish, and in that the cutting edges of the circular knives are designed with cutting edge regions by means of which the cutting edges in the fixed basic position are deformable out of the associated circular knife surface counter to an elastic restoring force in such a way that the cutting gap, by means of ray bones that are conveyed through it, can be widened to a size, corresponding to the cutting edge spacing, that corresponds to and is adapted to the difference between the wedge widths of the outermost ray bone at the tail end and of a ray bone at the head end.

In order to carry out the method according to the invention and/or to operate an apparatus according to the invention, a circular knife pair is characterized by suitably adapted properties of the circular knives. The circular knives are configured and designed in such a way that they have cutting edges with cutting edge regions by means of which the cutting edges are deformable out of the associated circular knife surface counter to an elastic restoring force in order to form a cutting gap in the fixed V-shaped arrangement of the circular knives, wherein the extent of the deformability is defined by and adapted to the difference between the wedge widths of a smallest ray bone at the tail end of a row of ray bones and a ray bone located at the head end of the ray bone row.

At the point where the ray bones start to appear, the cutting edges of the circular knives, which in the cutting edge region are flexibly deformable out of the circular knife surface counter to an elastic restoring force, are brought to bear against the ray bones at the tail end in the cutting gap set to the size of the ray bones at the tail end. The bearing is maintained as the fish is conveyed, wherein the cutting gap is widened due to the flexible deformability of the cutting edges of the circular knives fixed in the V-shaped arrangement, namely widened so as to match the geometry of the ray bones, wherein the wedge widths and at least at first also the lengths of the ray bones, to which the gap width corresponds as it increases as a result of the bending of the cutting edges, become larger from ray bone to ray bone. According to the invention, the situation is achieved whereby the filleting knives are guided as tightly as possible along the ray bones by bearing against the latter. This results in large cut surfaces which produce optimal meat yields, wherein the fillet meat is nevertheless reliably and completely freed of bones and fins. The method is particularly easy to carry out and the apparatus is of particularly simple design, so that handling and operation are considerably improved.

As a result of the measures according to the invention, the size of the smallest cutting edge spacing can be set to a root size of the smallest ray bone at the tail end at or close to the main bone stem, so that the increasing wedge width which widens the cutting gap starts with said root size as the smallest wedge width. As a result, with particular advantage, the meat-separating cut with a sharp knife blade is guided preferably directly against the body of the main bone and along the latter.

The measures according to the invention are particularly advantageous for performing filleting cuts which make cut surfaces that have a large area on the cut piece of fillet meat. Such large surface areas are produced by the filleting cut which is carried out as a back cut and which as such is guided along the dorsal ray bones of the fish.

One particularly advantageous and preferred configuration of the measures according to the invention lies in that the filleting cut is performed without adjusting the fixed V-shaped arrangement (basic position) of the circular knife pair along the entire row of ray bones. As in any case, the filleting cut starts at the outermost ray bone at the tail end and then ends at the outermost my bone at the head end. The cutting gap widens throughout the entire cutting process across the ray bones, without the circular knives being displaced or adjusted in any way in order to adapt to the geometry of the ray bones. The fixing of the V-shaped arrangement with a constant cutting edge spacing can be achieved in a particularly simple manner in that all the measures for dynamically widening the V-shaped arrangement, namely in particular restoring pressure spring devices, are omitted or blocked.

However, advantages are already achieved if the fixed V-shaped arrangement of the circular knives, in which the widening of the cutting gap is carried out by elastic bending of the knife cutting edges, is maintained at least up to the middle region of the fish. In any case, according to the invention, the smallest ray bone occurring at the tail end of the fish is grasped by positive-locking or non-positive-locking bearing against the deformable cutting edges, wherein the filleting cut is then guided along a number of the row of ray bones with the positive and non-positive/frictional connection being maintained. It may be provided that, in particular approximately in a middle region of the row of ray bones or close to the head end of the fish, the fixing arrangement of the circular knife pair is left such that the circular knives can then be displaced axially once the cutting edges have already been bent. It is always important that a widening of the V-shaped arrangement is preceded by a bending of the cutting edges bearing against the broadening ray bones. The apparatus can then be configured in such a way that the circular knives are arranged such as to be axially displaceable counter to a restoring pressure force in order to leave the fixed basic position, wherein the basic position remains fixed below a predefinable magnitude of the pressure force, that is to say for example by means of an axially acting pressure force source such as a pressure spring which reacts only when a predefined threshold of the force loading it is reached. Until the pressure threshold is reached, the deformation of the cutting edges and the resulting widening of the cutting gap remains dominant.

In order to perform the filleting cut according to the invention, it is important that the ray bone region at the tail end is freely accessible to the filleting cut, which starts from the tail end, along the dorsal and/or ventral ray bones. This is achieved particularly easily in a known manner in that the fish having abdominal cavities are conveyed in a linear filleting line by means of saddles which engage in the abdominal cavity, wherein the apparatus comprises a conveyor equipped with saddles.

One advantageous measure lies in that the circular knives in the region of the cutting gap are operated with a direction of rotation corresponding to the fish conveying direction.

Particularly large yields are achieved by the cutting according to the invention of white fish from the group consisting of Alaska pollock, haddock, cod and saithe and of salmonids from the group consisting of trout and pink salmon.

Dependent claims are directed to said and other advantageous embodiments of the invention. Only particularly advantageous embodiments and possibilities will be described in more detail with reference to the following description of the examples of embodiments shown in the schematic drawing. Each single or specific configuration within an example of embodiment is to be understood as an independent detail example for other embodiments and configurations which fall under the scope of the invention but which are not described or are not described in full.

In the drawing

BRIEF DESCRIPTION OF THE SEVERAL VIEWS OF THE DRAWING(S)

Figure 1B:
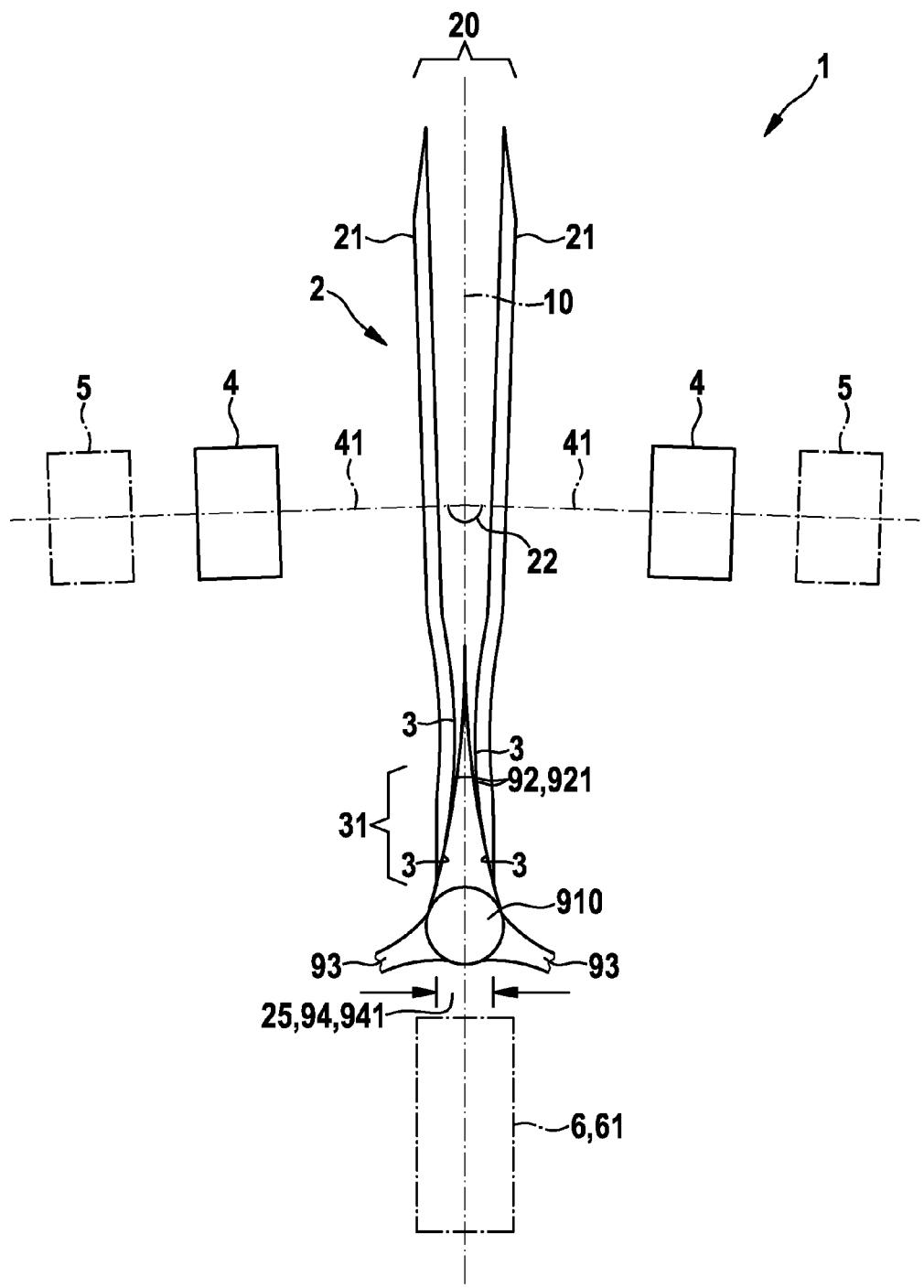
Figure 2:
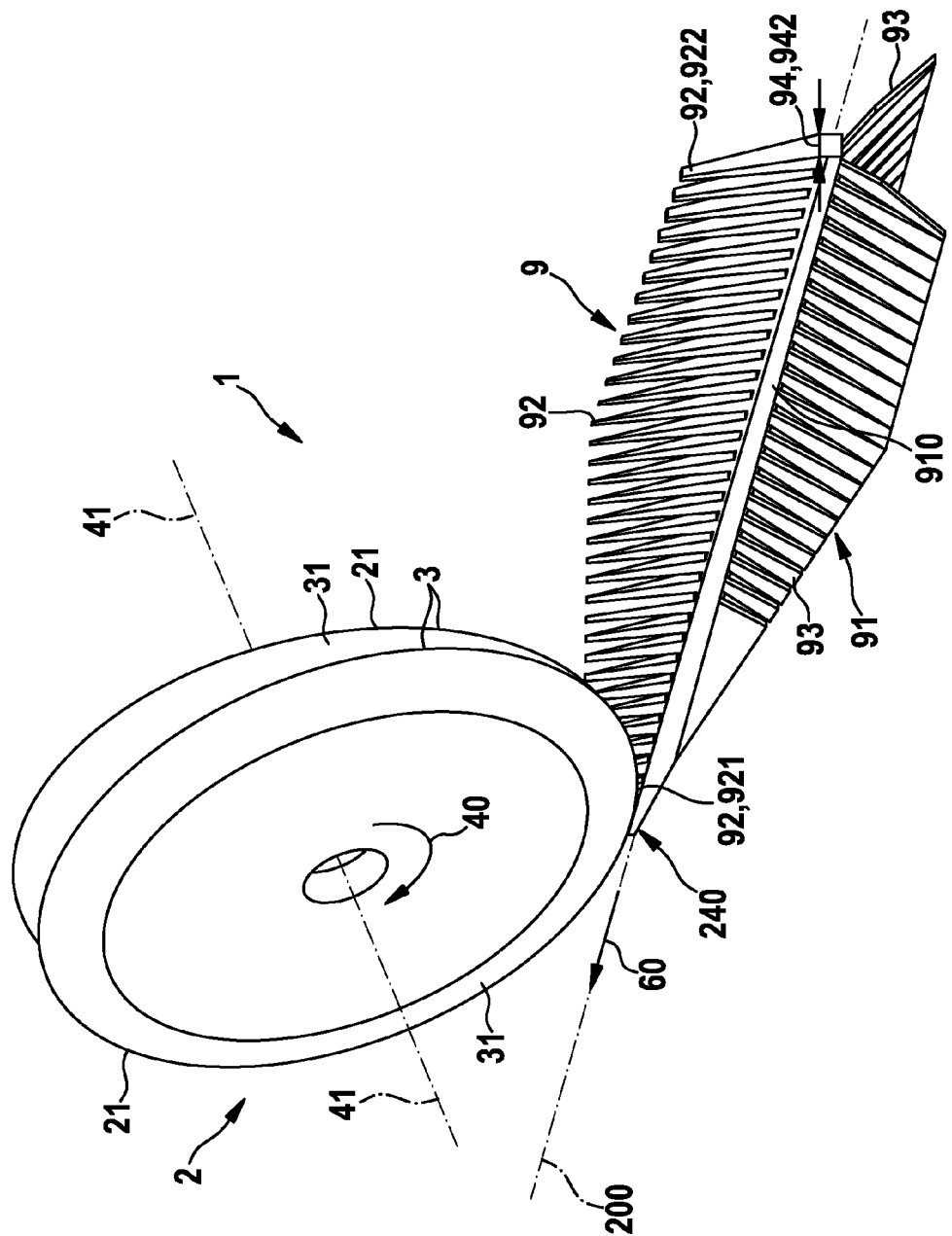
Figure 3:
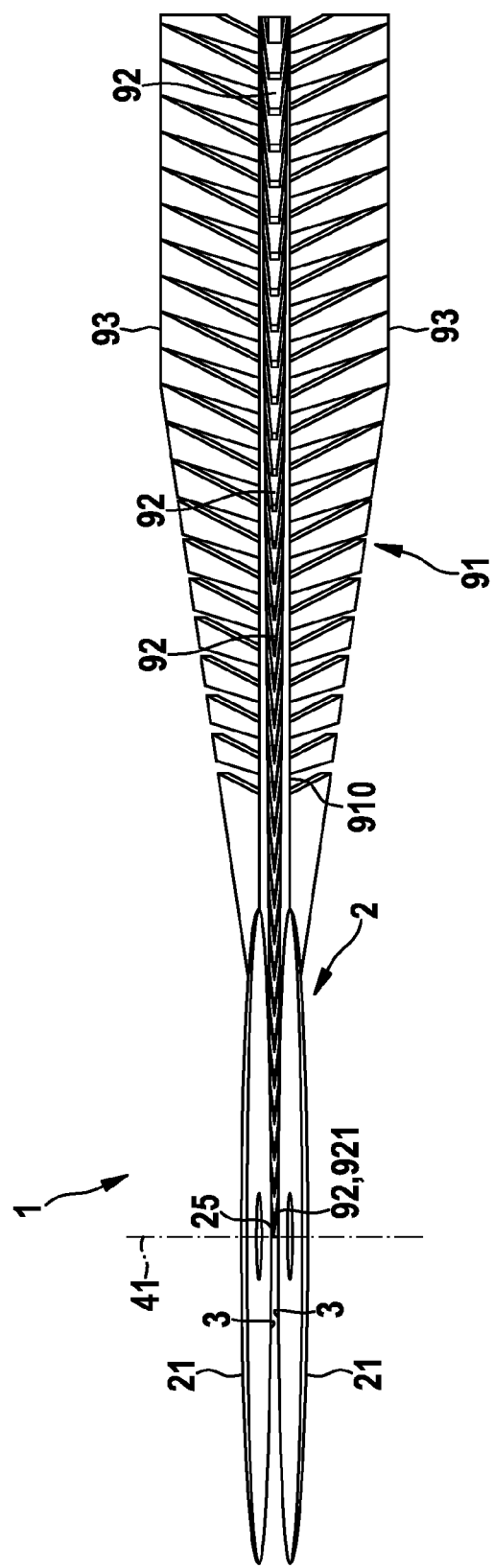

FIG. 1A shows, in front view, a V-shaped arrangement of a knife pair according to the invention as part of an apparatus according to the invention, on the run-in side facing towards fish to be cut, FIG. 1B shows, in front view, the V-shaped arrangement according to FIG. 1A with a fish running in tail end first, FIG. 2 shows, in an axonometric side view, the circular knife pair according to FIG. 1 with the fish to be cut running in, FIG. 3 shows a plan view of the circular knife pair with the fish running in, and FIG. 4 shows a diagram to explain the circular knife deformation according to the invention.

DETAILED DESCRIPTION OF THE INVENTION

An apparatus 1 according to the invention is shown only schematically with its essential parts. It comprises a pair 20 of circular knives 21 which are oriented in such a way that they form a V-shaped arrangement 2 with one side tapering to a point, said side facing towards a fish conveying path in a filleting line 200. The apparatus 1 is configured with its elements and units in a symmetrical manner in relation to a central plane 10 of the V-shaped arrangement 2. The circular knives 21 are mounted on drive shafts (not shown) of a respective drive device 4, for example a motor, said drive shafts extending in drive axes 41. As shown in dash-dotted line, each drive device 4 may be connected to an adjustment device 5 for axially displacing the circular knives 21. The apparatus 1 further comprises a conveying device 6 which is known per se and which is also shown only schematically in dash-dotted line and comprises for example conveying elements 61 in the form of saddles which each saddle a fish 9 in a known manner, wherein said saddles in the conveying direction 60 engage with a saddle-nose into the abdominal cavity of the fish 9, thereby pushing the latter. Said devices of the apparatus 1 are arranged on a machine frame (not shown).

Of a row of fish to be conveyed in the filleting line 200 with the conveying direction 60, one fish 9 is shown schematically only partially and incompletely without any pieces of meat and with some of its bones, namely with a main bone 91 having a stem 910 and dorsal ray bones 92 and flank bones 93 projecting away from the main bone stem 910, these being shown (schematically) in a particularly simplified manner. Each fish 9 enters the apparatus 1 in gutted form and with the head removed and is conveyed tail-first.

In FIG. 1A, one can see the circular knife pair 20 in its V-shaped arrangement 2 in a basic position, without any fish 9 passing through the circular knife pair 20. The circular knives 21 have knife surfaces 32 facing each other which each open into a cutting edge 3. In the V-shaped arrangement 2, the cutting edges 3 are chamfered on the outer side. In the basic position, the knife surfaces 32 lie over the entire surface in straight knife planes.

The circular knives 21 are arranged at a fixed distance from one another, which defines the basic position in which the V-shaped arrangement 2 is fixed in this position. This setting or arresting is to be understood to mean that the circular knives 21 are held and mounted in their axial position and in a manner secured against axial displacement. A cutting gap 24 is formed between the cutting edges 3 in the region of the cutting edge spacing 25. The drive axes 41 intersect one another at a fixed obtuse knife angle 22, and the smallest spacing 25 of the cutting edges 3 is configured with a fixed basic size at the narrowest cutting point 240 of the cutting gap 24. This basic size can be set to a desired dimension, and fixed at this dimension, by means which are not shown. In a manner corresponding to the obtuse knife angle 22, the lengthened imaginary knife planes 32 intersect at an acute V-angle relative to the central plane of symmetry, for example at approximately 2°.

According to the invention, it is particularly important that the cutting edge spacing 25 with its basic size in the fixed basic position of the V-shaped arrangement 2 is at least substantially equal to or slightly smaller than a wedge width 94, 941 of the outermost dorsal ray bone 92, 921 at the tail end of a row of dorsal ray bones 92 of the fish 9. For the geometry of such ray bones 92, it is typical that each ray bone 92 which projects away from the main bone 91 of the fish 9 on the back thereof decreases in a wedge-shaped manner from the main bone stem 910 in terms of its dimension transverse to the latter, wherein the wedge widths 94, and depending on the fish also the bone lengths along a certain length of the fish, increase from ray bone 92 to ray bone 92 towards the fish head end. Said tailoring and dimensioning of the basic size of the cutting edge spacing 25 relates to the wedge width 941 which exists at or in any case close to the main bone stem 910.

Another essential measure of the invention is linked to the dimensioning of the basic size of the cutting edge spacing 25 and the fixing of this basic size, namely the fact that the cutting edges 3 of the circular knives 21, in a cutting edge region 31 which is annular, are able to bend elastically towards the outside of the V-shaped arrangement 2 under a pressure/spreading force, namely counter to an elastic restoring force of the material of the cutting edge region 31. During dynamic operation of the circular knives 21, this bending is associated with the formation of a wave form of the cutting edge 3 transverse to the circular knife surface 32, as will be explained in more detail with reference to FIG. 1B and FIG. 4.

The V-shaped arrangement 2 is such and is guided in such a way that the circular knives 21 have the cutting gap 24 with the smallest cutting edge spacing 25 at their zenith points of the cutting edges 3 that are located closest to the main bone stem 910 of the fish 9 to be cut. In the example of embodiment, the narrowest cutting point 240 is located at the lowermost points on the circumference of the circular knives 21, corresponding to the 6 o'clock position. Control and guide means (not shown) which are known per se are provided for carrying out the displacement of the V-shaped arrangement 2 of the circular knives 21 for the purpose of positioning the latter for the respective fish 9 to be filleted, in a manner dependent on the size and the time it takes for the fish to pass.

For the elastic flexibility of the cutting edge region 31 with the cutting edges 3, it is important that the latter are particularly sharp cutting elements which reliably cut through and cut off muscle meat and skin without the aid of other tools. Starting from the fixed basic size of the cutting gap 24 with the smallest cutting edge spacing 25, the cutting edges 3 can bend outwards to a particular extent counter to the elastic restoring force.

As can be seen from FIG. 1B, the bearing and bending take place as early as with the first, outer dorsal ray bone 921 at the tail end. The basic size of the cutting edge spacing 25 is configured for this measure. The cutting edges 3 make contact at the main bone stalk 910, and in the cutting edge region 31 the circular knives 21 huddle against the wedge shape of the dorsal ray bone 921. As a result, the dorsal back filleting cut starts in an optimally tight position bearing against the dorsal ray bone 921. As the method according to the invention continues, while maintaining the fixed position of the V-shaped arrangement 2 of the circular knives 21, the ray bones 92 bearing against the circular knife cutting edges 3 are guided through the cutting gap 24 by the fish conveyor, wherein the circular knife cutting edges 3, counter to the elastic restoring force, are displaced by the broadening ray bones 92 with increasing widening of the cutting gap 24, starting from the basic size at the narrowest cutting point 240 in the fixed V-shaped arrangement 2.

In the example of embodiment, there is shown at the head-end region of the fish 9 a dorsal ray bone 92, 922 which has a wedge width 94, 942, and the geometric conditions are such that each fish 9 is cut by the apparatus 1 over its full length, that is to say as far as the outermost dorsal ray bone 94 at the head end having the largest wedge width 94, namely without the circular knives 21 being displaced or adjusted in any way in order to adapt to the geometry of the ray bones 92. If the apparatus 1 has the adjustment device 5, the adjustment device 5 can be designed to fix the V-shaped arrangement 2. Any other suitable fixing or setting means may be provided.

In the example of embodiment, the widening V-shaped space between the flexible circular knives 21 in collaboration with the widening between the cutting edge regions 31 is so great that, despite the axial fixing of the spacing of the circular knives 21, the broadening dorsal ray bones 92 and the back fins are accommodated in or allowed to pass through said space without further special measures. In this setting, the back filleting cut is therefore performed over the entire row of dorsal ray bones 32.

In the example of embodiment, the circular knives 21 are operated with a direction of rotation 40 which in the region of the cutting gap 24 corresponds to the fish conveying direction 60. It has been found that this encourages the widening and the entire dynamic deformation behaviour of the circular knives 21 in the cutting edge regions 31 for adapting to the thickening ray bones 92.

Within the scope of the invention, it is also possible that the circular knives 21 are arranged such as to be able to be displaced axially counter to a restoring pressure force, for example counter to a pressure spring force, by means of the adjustment devices 5 (only optionally provided) depending on the particular setting. The axial displacement is always configured such that the V-shaped basic position remains fixed below a predefinable magnitude of the pressure force, so that the widening of the cutting gap by a bending of the cutting edges always precedes the axial movement.

With reference to FIG. 4, there will be explained the dynamic conditions by which the circular knife 21 according to the invention is distinguished and by which it is characterized. In FIG. 4, it is possible to see one circular knife 21 of the circular knife pair 20, said circular knife rotating for example at 1500 revolutions per minute in the direction of rotation 40. Dorsal ray bones 92 are shown only by simple dashes inclined in the conveying direction 60 of the fish 9, these becoming longer towards the head end of the fish 9. Some ray bones 92 have already run through the cutting gap 24. In the snapshot shown, the dorsal ray bone 920 should be located at the narrowest cutting point 240 of the cutting gap 24. Meanwhile, a dorsal ray bone 924 at the head end is located with its tip immediately prior to entering the V-shaped space of the circular knife pair 20. It has been found that the circular knives 21, even in their region 33 trailing behind the narrowest cutting point 240, adapt in their pointed or free end region to the shape and geometry of the ray bone 924 by means of deformation, namely as a result of the widening of the cutting edge spacing 25 at the narrowest point 240 of the cutting gap 24. This effect is produced to a particularly pronounced extent as a result of the fact that the direction of rotation 40 and the conveying direction 60 are in the same direction or correspond.

More specifically, as the circular knife 21 rotates about its drive axis 41, a wavy profile of the cutting edge 3 transverse to the knife surface 32 is obtained as a result of the bending at the narrowest cutting point 240 in the region of the cutting edge region 31. This wavy profile can be seen in the front view of FIG. 1B. While the cutting edge 3 is bent outwards at the narrowest point 240, the bending, displacing force brought about by the wedge width 941 is subjected to a reaction force, as a result of which the cutting edge region 31 or the cutting edge 3 trailing behind the cutting point 24 deforms inwards in the direction opposite to the bending direction, namely with a frequency or interval such that, between the outward bending and the inward bending, an angle 26 of for example typically around 65° occurs, this being referred to as the wave angle. Consequently, one particular and advantageous effect of the invention lies in the fact that the circular knives 21 huddle against one another at the region of their tip already when the ray bone 924 shown in FIG. 4 enters the V-shaped knife gap, so that the meat is cut off in an optimal manner. The deformation brought about by the reaction force corresponds particularly advantageously to the decreasing wedge shape of the ray bones 92, that is to say to the conicity over the length thereof.

In the example given, a change in the bending direction of the cutting edge region 31 transverse to the knife surface 32 of each circular knife 21 is brought about for example at an angle 27 of around 22°, this being referred to as the bending reversal angle. In any case, it has been found that with the cutting edge widening according to the invention optimal cutting conditions are achieved at the narrowest point 240 of the cutting edge spacing 25 in the cutting gap 24 since the cut made by the cutting edges 3 adapts not only to the wedge widths 94 at the base of the ray bones 92 but also to the tapering (decreasing) wedge widths 94 of each ray bone 92. Obviously the circular knife 21 in the cutting edge region 31, as seen in the radial direction of the cutting edges 3, performs a type of "dynamic wave cut". Preferably, each circular knife according to the invention is set and is configured in terms of its material properties to such a wave form. Preferably and advantageously, for a speed of more than 1000 revolutions per minute, a wave angle 26 in the range from 60° to 90° is set, which then trails behind the narrowest point 240 in the mounted apparatus 1, as can be seen from FIG. 4.

In general, according to the invention, a cutting edge spacing 25 having a basic size of 3 mm and less can be set at the narrowest point 240 of the V-shaped arrangement 2. A preferred speed of the circular knives 21 lies in the range from 1000 to 2000 revolutions per minute, preferably in the region of 1500 revolutions per minute. A suitable material for the circular knife 21 is in particular a hardened steel alloy, wherein the circular knife 21 preferably has a diameter of 200 mm and a sheet thickness of 2 mm. The cutting edge region 31 preferably has an annular width which is selected to be in the region of 25% of the circular knife radius. The cutting edge region 31 is in particular ground to reduce its thickness in order to achieve said described wave deformation or bending of the cutting edge 3. In any case, the static and dynamic elasticity in the cutting edge region 31 is such that the latter, in the fish-free, unloaded state, returns to the basic size of the cutting edge spacing 25 between the cutting edges 3 at the narrowest point 240. A modulus of elasticity (elastic bendability) of the cutting edge 3 transverse to the circular knife surface 32 in the range from approximately 0.04 mm/degree to 0.06 mm/degree has proven to be particularly advantageous.

The invention claimed is:

1. Method for performing a filleting cut for filleting fish, wherein the fish are conveyed tail-first in a filleting line and the filleting cut is performed along a row of wedge-shaped ray bones projecting away from a main bone stem with a wedge width increasing from ray bone to ray bone by means of a pair of circular knives which have sharp cutting edges and which cut through meat, said circular knives having drive axes which are oriented at a knife angle relative to one another and define a V-shaped arrangement of the circular knives, wherein the conveyed fish are cut by the filleting cut starting from their tail end, characterized in that the filleting cut is performed with a setting and position of the circular knives such that the circular knives in the V-shaped arrangement have at their zenith points of the cutting edges located closest to the main bone stem a set smallest cutting edge spacing which defines a cutting gap, and in that, starting from the tail end, meat of each fish is cut by means of the circular knife pair such that the cutting gap with the smallest cutting edge spacing is set to a basic size which is at least substantially equal to or smaller than a wedge width of the outermost ray bone at the tail end of the conveyed fish, and in that, in the fixed position of the V-shaped arrangement of the circular knives, the ray bones, the wedge widths of which increase from ray bone to ray bone towards the fish head end, are guided by the fish conveyor through the cutting gap in a manner bearing against the circular knife cutting edges, wherein, starting from the basic size in the fixed V-shaped arrangement, the circular knife cutting edges, which in their cutting edge region are flexibly deformable out of the associated circular knife surface counter to an elastic restoring force, are displaced counter to the elastic restoring force by means of the broadening ray bones with increasing widening of the cutting gap.

2. Method according to claim 1, characterized in that the size of the smallest cutting edge spacing is set to a root size of the smallest ray bone at the tail end, so that the increasing wedge width which widens the cutting gap starts with said root size as the smallest wedge width.

3. Method according to claim 1, characterized in that the filleting cut is performed as a back cut which is guided along the dorsal ray bones of the fish.

4. Method according to claim 1, characterized in that the filleting cut is performed along the entire row of ray bones with a fixed V-shaped arrangement of the circular knives and with a widening of the cutting gap that starts at the outermost ray bone at the tail end and ends at the outermost ray bone at the head end, wherein the ray bones, which become thicker along their length, remain free in the space between the circular knives fixed in the V-shaped arrangement.

5. Method according to claim 1, characterized in that the fixed V-shaped arrangement of the circular knives, in which the cutting gap is widened by an elastic bending of the circular knife cutting edges, is maintained at least until the middle region of the fish.

6. Method according to claim 1, characterized in that the position of the V-shaped arrangement of the circular knives, which is fixed in any event initially when the ray bones at the tail end enter the cutting gap, transitions into positions of the V-shaped arrangement which arise as a result of axial displacement of the circular knives due to the increasing wedge widths of the ray bones, wherein at the same time the increasing wedge widths of the ray bones widen the cutting gap by bending the cutting edges.

7. Method according to claim 1, characterized in that the fish having abdominal cavities are conveyed in a linear filleting line by means of saddles which engage in the abdominal cavity.

8. Method according to claim 1, characterized in that the circular knives in the region of the cutting gap are operated with a direction of rotation corresponding to the fish conveying direction.

9. Method according to claim 1, characterized in that white fish from the group consisting of Alaska pollock, haddock, cod and saithe are cut.

10. Method according to claim 1, characterized in that salmonids from the group consisting of trout and pink salmon are cut.

11. Apparatus for performing a filleting cut by the method according to claim 1, comprising a pair of circular knives which have sharp cutting edges and which cut through meat, said circular knives having drive axes which are oriented at a knife angle relative to one another and define a V-shaped arrangement of the circular knives, as well as a conveying device by which the fish are conveyed tail-first in a row and which leaves a free space in which the circular knife pair is arranged for cutting off the meat along a row of ray bones of the fish that project away from a main bone stem, characterized in that the circular knives in their V-shaped arrangement form at zenith points of the cutting edges located closest to the passing main bone stem a cutting gap which has the smallest cutting edge spacing of the knife pair, the size of which can be configured for cutting the conveyed fish, in that the V-shaped arrangement of the circular knives has a fixed basic position to which there is assigned said smallest cutting edge spacing with a fixed basic size which is at least substantially equal to or smaller than a wedge width of the outermost ray bone at the tail end of the conveyed fish, and in that the cutting edges of the circular knives are designed with cutting edge regions wherein the cutting edges in the fixed basic position are deformable out of the associated circular knife surface counter to an elastic restoring force in such a way that the cutting gap, as the ray bones are conveyed through the gap, can be widened to a size, corresponding to the cutting edge spacing, that corresponds to and is adapted to the difference between the wedge width of the outermost ray bone at the tail end and the wedge width of a ray bone at the head end.

12. Apparatus according to claim 11, characterized in that the conveying device comprises a conveyor comprising saddles, wherein the saddles are configured to engage in the abdominal cavities of the fish.

13. Apparatus according to claim 11, characterized in that the circular knives are designed and arranged to perform a back cut which produces the filleting cut.

14. Apparatus according to claim 11, characterized in that the circular knives are arranged such as to be able to be displaced axially counter to a restoring pressure force, wherein the axial displacement is such that the V-shaped basic position remains fixed below a predefinable magnitude of the pressure force.

15. Apparatus according to claim 14, characterized in that the pressure force with associated bearing which permits and acts against the axial displacement of the circular knives is configured to be greater than a restoring force in the smallest cutting gap which permits the bending of the cutting edges and acts against said bending, wherein the smaller restoring force in the cutting gap is defined and set by the elastic material nature of the region of the cutting edges.

16. Circular knife pair, configured for carrying out the method according to claim 1, characterized in that the circular knives of the circular knife pair have cutting edges with cutting edge regions by means of which, in the fixed V-shaped arrangement of the circular knives, the cutting edges are deformable out of the associated circular knife surface counter to an elastic restoring force, wherein the extent of the deformation in relation to a smallest cutting gap of the V-shaped arrangement is adapted to and thus defined by the deformability corresponding to the difference between the wedge width of a smallest ray bone at the tail end of a row of ray bones and the wedge width of a ray bone located at the head end of said ray bone row.

17. Circular knife, configured for carrying out the method according to claim 1, characterized in that the circular knife is designed with an annular cutting edge region, the material thickness and material properties of which are selected in such a way that the circular knife in said cutting edge region is deformable under a bending pressure transverse to the circular knife surface at least in the dynamically rotating state transversely to the circular knife surface in a wave-like manner along its cutting edge under the effect of an elastic restoring force, wherein the deformation is cancelled when the bending pressure stops.

18. Circular knife according to claim 17, characterized in that the circular knife has an elastic bendability of the cutting edge on both sides transversely to the circular knife surface in the range from approximately 0.04 mm/degree to 0.06/degree.

* * * * *